United States Patent
Bates et al.

(10) Patent No.: US 7,480,552 B2
(45) Date of Patent: Jan. 20, 2009

(54) METHOD AND SYSTEM FOR CONTROLLING AN AUTOMATIC TRANSMISSION USING A GPS ASSIST HAVING A LEARN MODE

(75) Inventors: Cary Lee Bates, Rochester, MN (US); Robert James Crenshaw, Apex, NC (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/548,260

(22) Filed: Oct. 10, 2006

(65) Prior Publication Data

US 2007/0135996 A1    Jun. 14, 2007

Related U.S. Application Data

(62) Division of application No. 09/822,103, filed on Mar. 30, 2001, now Pat. No. 7,146,264.

(51) Int. Cl.
 G06F 7/00 (2006.01)
 G06F 17/00 (2006.01)
 G06F 19/00 (2006.01)
(52) U.S. Cl. ............. 701/51; 701/52; 701/55; 701/59
(58) Field of Classification Search ......... 701/51–52, 701/55, 65, 57–59, 213; 340/5.1; 342/357.06, 342/357.12; 398/125, 130–13; 706/905
See application file for complete search history.

(56) References Cited

U.S. PATENT DOCUMENTS

| 504,373 | A | | 9/1893 | Steward |
| 4,148,231 | A | | 4/1979 | Redzinski |
| 4,208,925 | A | * | 6/1980 | Miller et al. ............. 477/63 |
| 4,359,733 | A | * | 11/1982 | O'Neill .................. 342/36 |
| 4,380,048 | A | | 4/1983 | Kishi et al. |

(Continued)

FOREIGN PATENT DOCUMENTS

JP   07004515 A  *  1/1995

(Continued)

OTHER PUBLICATIONS

Geo-Referencing Radar Plot Data for the Traffic Information Service Broadcast; Giovino, J.D.; 25th Digital Avionics Systems Conference, 2006 IEEE/AIAA; Oct. 2006 pp. 1-9; Digital Object Identifier 10.1109/DASC.2006.313686.*

(Continued)

Primary Examiner—Cuong H Nguyen
(74) Attorney, Agent, or Firm—Sawyer Law Group LLP

(57) ABSTRACT

A method and system for controlling an automatic transmission is disclosed. The method and system include obtaining positioning data using a global positioning satellite (GPS) and monitoring the automatic transmission to obtain transmission data. The method and system also include learning whether performance of the automatic transmission can be improved utilizing the positioning data and the transmission data. Moreover, the method and system include adjusting a shift threshold for the positioning data for the automatic transmission if it is determined that the performance of the automatic transmission can be improved.

10 Claims, 8 Drawing Sheets

U.S. PATENT DOCUMENTS

| | | | |
|---|---|---|---|
| 4,896,565 A | | 1/1990 | Simonyi et al. |
| 5,024,125 A | | 6/1991 | Baba |
| 5,411,449 A | | 5/1995 | Takahashi et al. |
| 5,435,796 A | | 7/1995 | Fujita et al. |
| 5,443,432 A | | 8/1995 | Fujita et al. |
| 5,445,577 A | | 8/1995 | Fujita et al. |
| 5,545,108 A | | 8/1996 | Wagner et al. |
| 5,658,213 A | | 8/1997 | Sato et al. |
| 5,832,400 A | | 11/1998 | Takahashi et al. |
| 5,911,771 A | | 6/1999 | Reichart et al. |
| 5,931,886 A | | 8/1999 | Moroto et al. |
| 6,009,374 A | * | 12/1999 | Urahashi ............... 701/209 |
| 6,038,505 A | | 3/2000 | Probst et al. |
| 6,070,118 A | * | 5/2000 | Ohta et al. .............. 701/65 |
| 6,085,137 A | | 7/2000 | Aruga et al. |
| 6,095,945 A | | 8/2000 | Graf |
| 6,098,005 A | | 8/2000 | Tsukamoto et al. |
| 6,176,811 B1 | | 1/2001 | Popp et al. |
| 6,182,000 B1 | * | 1/2001 | Ohta et al. .............. 701/55 |
| 6,275,760 B1 | | 8/2001 | Saito et al. |
| 6,278,928 B1 | * | 8/2001 | Aruga et al. ............ 701/65 |
| 6,349,253 B1 | | 2/2002 | Bellinger |
| 6,356,555 B1 | | 3/2002 | Rakib et al. |
| 6,436,005 B1 | * | 8/2002 | Bellinger ............... 477/111 |
| 6,442,667 B1 | * | 8/2002 | Shiell et al. ............ 711/207 |
| 6,503,170 B1 | * | 1/2003 | Tabata .................. 477/97 |
| 6,516,261 B2 | * | 2/2003 | Ohashi et al. ............ 701/51 |
| 6,546,329 B2 | * | 4/2003 | Bellinger ............... 701/115 |
| 6,740,006 B2 | * | 5/2004 | Tabata .................. 477/118 |
| 6,819,995 B2 | | 11/2004 | Bellinger |
| 2001/0016795 A1 | | 8/2001 | Bellinger |
| 2001/0049573 A1 | * | 12/2001 | Ohashi et al. ............ 701/51 |
| 2002/0143454 A1 | | 10/2002 | Bates et al. |

FOREIGN PATENT DOCUMENTS

| | | | |
|---|---|---|---|
| JP | 07098060 A | * | 4/1995 |
| JP | 07224929 A | * | 8/1995 |
| JP | 07-275637 | | 10/1995 |
| JP | 08-115575 | | 4/1996 |
| JP | 08240261 A | * | 9/1996 |
| JP | 2000046176 A | * | 2/2000 |
| JP | 2005147302 A | * | 6/2005 |

OTHER PUBLICATIONS

System overview and special features of FATE: fuzzy logic automatic transmission expert system; Bastian, A. et al.; Fuzzy Systems, 1995. International Joint Conference of the Fourth IEEE International Conference on Fuzzy Systems and The Second International Fuzzy Engineering Symposium., Proceedings of 1995 IEEE Internation.*

Learning capabilities for improving automatic transmission control; Fournier, L.; Intelligent Vehicles '94 Symposium, Proceedings of the; Oct. 24-26, 1994 pp. 455-460; Digital Object Identifier 10.1109/IVS.1994.639561.*

Control actuation of fully automated heavy-duty vehicles using SAE J1939; Dickey, S.R.; Xian-Yun Lu; Intelligent Vehicles Symposium, 2003. Proceedings. IEEE; Jun. 9-11, 2003 pp. 400-405; Digital Object Identifier 10.1109/IVS.2003.1212944.*

Estimation of road grade and vehicle mass via model predictive control; Winstead, V.; Kolmanovsky, I.V.; Control Applications, 2005. CCA 2005. Proceedings of 2005 IEEE Conference on; Aug. 28-31, 2005 pp. 1588-1593; Digital Object Identifier 10.1109/CCA.2005.1507359.*

Coordinated vehicle position determining and communication channel data transmission system; Rypinski, C.A.; Vehicular Technology Conference, 1967. 18th IEEE; vol. 18, Dec. 6-8, 1967 pp. 133-144.*

Speed control for automated manual transmission with dry clutch; Glielmo, L.; Iannelli, L.; Vacca, V.; Vasca, F.; Decision and Control, 2004. CDC. 43rd IEEE Conference on; vol. 2, Dec. 14-17, 2004 pp. 1709-1714 vol. 2.*

Integrated data collection and transmission system for automatic environmental test data acquisition; Kamiya, M.; Ikeda, H.; Shinohara, S.; Industry Applications Conference, 2000. Conference Record of the 2000 IEEE; vol. 2, Oct. 8-12, 2000 pp. 1311-1316 vol. 2; Digital Object Identifier 10.1109/IAS.2000.882053.*

J. Hahn et al., Self-learning approach to automatic transmission shift control in a commercial construction vehicle during the inertia phase, Journal of Automobile Engineering v 216 n 11 2002, pp. 909-919 (from DialogClassic Web(TM) file 8 acc. No. 06271883).

Ferit Kucukay et al., Intelligent control of automatic transmissions using electronics, ATZ Automobiletechnische Zeitschrift v 96 n 4 Apr. 1994, p. 228-235 (from DiglogClassic Web(TM) file 8, acc. No. 03974784).

* cited by examiner

METHOD AND SYSTEM FOR CONTROLLING AN AUTOMATIC TRANSMISSION USING A GPS ASSIST HAVING A LEARN MODE

CROSS-REFERENCE TO RELATED APPLICATIONS

The present application is a divisional of U.S. patent application Ser. No. 09/822,103, filed Mar. 30, 2001.

FIELD OF THE INVENTION

The present invention relates to automatic transmissions, and more particularly to a method and system for improving the performance and lifetime of the automatic transmission using a global positioning system.

BACKGROUND OF THE INVENTION

Automatic transmissions are used in a variety of vehicles. Automatic transmissions generally reduce the burden on a driver by automatically shifting the vehicle to a new gear based on conditions in the transmission. FIG. 1 depicts a conventional method 10 used by an automatic transmission. The load on the automatic transmission is monitored, via step 12. Thus, the condition of the automatic transmission is known throughout use of the vehicle. It is determined whether the load indicates that the shift thresholds of the automatic transmission have been reached via step 14. If the shift thresholds have not been reached, then no action is taken and the loads on the automatic transmission are continued to be monitored. If, however, it is determined that the shift thresholds have been reached, then the automatic transmission shifts, via step 16. If it is determined in step 14 that a lower shift threshold is reached, then the automatic transmission shifts to a lower gear in step 16. If it is determined in step 14 that a higher shift threshold has been reached, then the automatic transmission shifts to a higher gear in step 16. Thus, the automatic transmission shifts gears for the vehicle based on the load to the transmission.

Recently, global positioning satellite (GPS) systems have become more widely used in vehicles such as automobiles. A GPS system utilizes an orbiting GPS satellite and a GPS unit on the vehicle. Through communication between the GPS unit and the GPS satellite, the location, direction of travel and, in some cases, the altitude of the vehicle in which the GPS unit resides can be determined. Furthermore, the GPS system can be utilized to adjust the shift threshold of the automatic transmission. For example, GPS navigation systems ace typically equipped with a map indicating physical bodies, such as streets and buildings, in the area in which the vehicle currently is. This ability can be used to adjust the shift thresholds.

FIG. 2 depicts a conventional method 50 for changing operation of the automatic transmission using the GPS system. Based on GPS data obtained from the GPS navigation system, it is determined whether the vehicle is approaching some particular geographic body, via step 52. For example, the geographic body may be an intersection or a particular stretch of road. The particular type of geographic bodies are typically preset in the GPS system. The shift thresholds are then adjusted, via step 54. Thus, the shifting of the automatic transmission can be changed using the GPS system.

Although the conventional method 50 can improve performance of the automatic transmission, one of ordinary skill in the art will readily realize that the conventional method 50 is rather inflexible. In particular, the conventional method 50 utilizes only preset types of geographic landmarks to improve performance of the automatic transmission. Thus, other factors including but not limited to the behavior of the transmission are not accounted for. Thus, in general the shift thresholds for an automatic transmission are still relatively static. As a result, the automatic transmission may still shift at a non-optimal time given the local terrain. For example, the automatic transmission may still shift down just as a vehicle crests a hill or shift up just as the vehicle reaches a hill. The automatic transmission will then shift back up or back down shortly after the previous shift was completed. As a result, the smoothness of the ride, gas mileage, and the lifetime of the automatic transmission can be adversely impacted.

Accordingly, what is needed is a system and method for improving the performance and lifetime of the automatic transmission. The present invention addresses such a need.

SUMMARY OF THE INVENTION

The present invention provides a method and system for controlling an automatic transmission. The method and system include obtaining positioning data using a global positioning satellite (GPS) and monitoring the automatic transmission to obtain transmission data. The method and system also include learning whether performance of the automatic transmission can be improved utilizing the positioning data and the transmission data. Moreover, the method and system include adjusting a shift threshold for the positioning data for the automatic transmission if it is determined that the performance of the automatic transmission can be improved.

According to the system and method disclosed herein, the present invention provides a method and system which is able to utilize GPS positioning data for a vehicle and learn how to improve the shifting characteristics of the automatic transmission of a vehicle.

DETAILED DESCRIPTION OF THE INVENTION

The present invention relates to an improvement in control of automatic transmission in automotive or other systems. The following description is presented to enable one of ordinary skill in the art to make and use the invention and is provided in the context of a patent application and its requirements. Various modification to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for controlling an automatic transmission. The method and system include obtaining positioning data using a global positioning satellite (GPS) and monitoring the automatic transmission to obtain transmission data. The method and system also include learning whether performance of the automatic transmission can be improved utilizing the positioning data and the transmission data. Moreover, the method and system include adjusting a shift threshold for the automatic transmission for the positioning data if it is determined that the performance of the automatic transmission can be improved.

The present invention will be described in terms of particular methods having certain steps. However, one of ordinary skill in the art will readily recognize that this method and system will operate effectively for methods having other or different steps. In addition, the present invention will be described in terms of a particular system used with an automatic transmission. One of ordinary skill in the art will, however, recognize that the system cam be organized differently or interact with different components of a vehicle.

Figure 1:
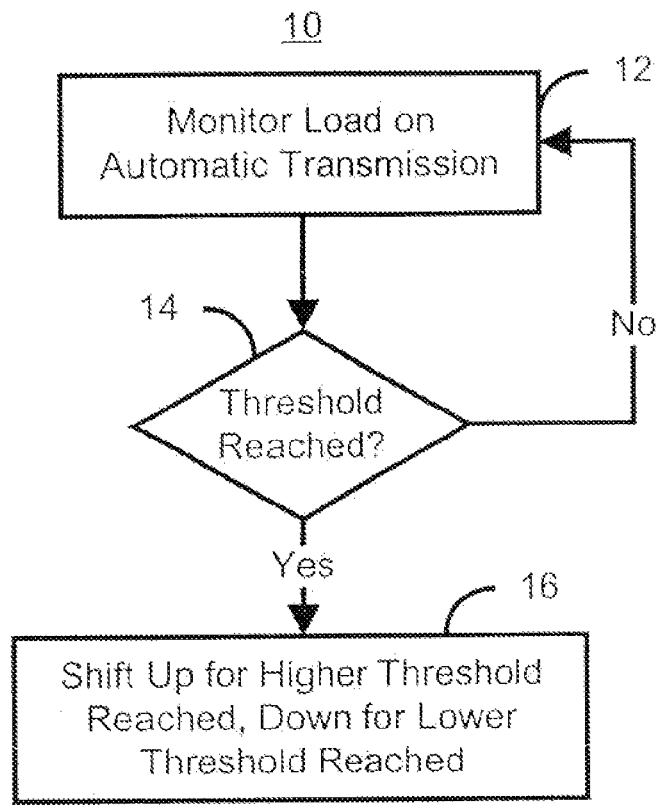
FIG. 1 is a flow chart depicting a conventional method 10 for shifting using an automatic transmission.
Figure 2:
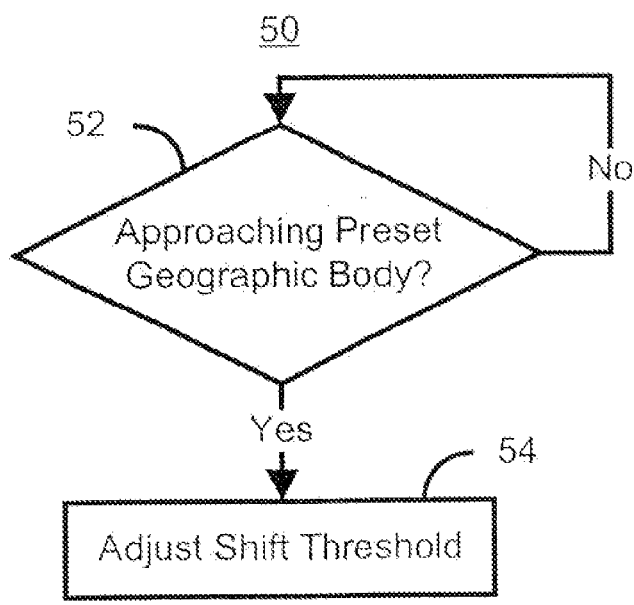
FIG. 2 is a flow chart of a conventional method for updating the automatic transmission of a vehicle based on road conditions.
Figure 3A:
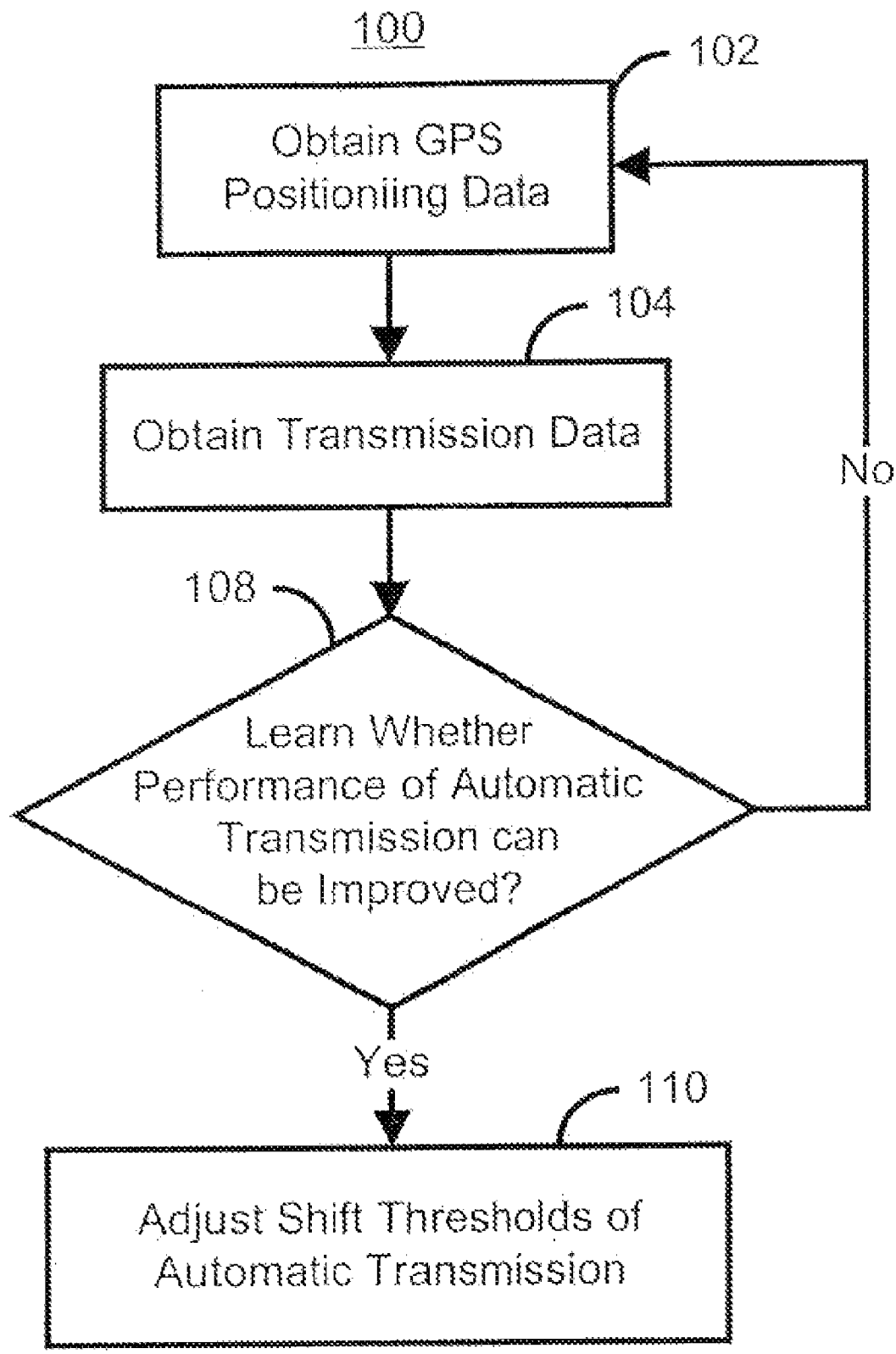
FIG. 3A is a high-level flow chart of one embodiment of a method in accordance with the present invention for controlling an automatic transmission using GPS assistance.

To more particularly illustrate the method and system in accordance with the present invention, refer now to FIG. 3A, depicting a high-level flow chart of one embodiment of a method 100 in accordance with the present invention for controlling a vehicle's automatic transmission using GPS assistance. The method 100 is used in conjunction with an automatic transmission (not shown in FIG. 3A) and a GPS subsystem (not shown in FIG. 3A) that receives data from a GPS satellite (not shown in FIG. 3A). GPS positioning data is obtained, via step 102. In a preferred embodiment the positioning data obtained in step 102 includes the position of the vehicle as well as the direction of travel. The positioning data might include the altitude of the vehicle. The speed of the vehicle may also be included in the positioning data, but need not be determined using a GPS satellite. The automatic transmission is also monitored to obtain transmission data, via step 104. Preferably, the automatic transmission's load, or torque, is monitored in step 104. In addition, the time in a particular gear may be monitored in step 104. Preferably, step 102 and 104 occur throughout the operation of the automatic transmission.

Using the positioning data and the transmission data it is learned whether performance of the automatic transmission can be improved, via step 108. In a preferred embodiment, the number of times a shift to a new gear followed shortly thereafter by a shift back to the original gear has occurred for the same positioning data can be used to learn whether performance of the automatic transmission can be improved. In an alternate embodiment, another mechanism can be used to learn whether performance can be improved. For example, in an alternate embodiment the load on the automatic transmission could be monitored to determine whether the load changes greatly in a short time after the shift. In either case, the shift that was performed can adversely affect the performance of the automatic transmission. If it is determined that the performance of the automatic transmission can be improved in step 108, then the shift thresholds of the automatic transmission are adjusted for the positioning data improve performance, via step 110. In a preferred embodiment, the shift thresholds are adjusted as the vehicle approaches the position indicated by the data and is traveling in the direction indicated by the positioning data, then may be readjusted when the vehicles moves away from the position.

Thus, the method 100 learns whether performance of the automatic transmission is suffering at certain positions and adjusts the shift thresholds of the automatic transmission to improve performance at these positions. As a result, shifting may be smoother, wear and tear on the automatic transmission reduced, and gas mileage improved.

Figure 3B:
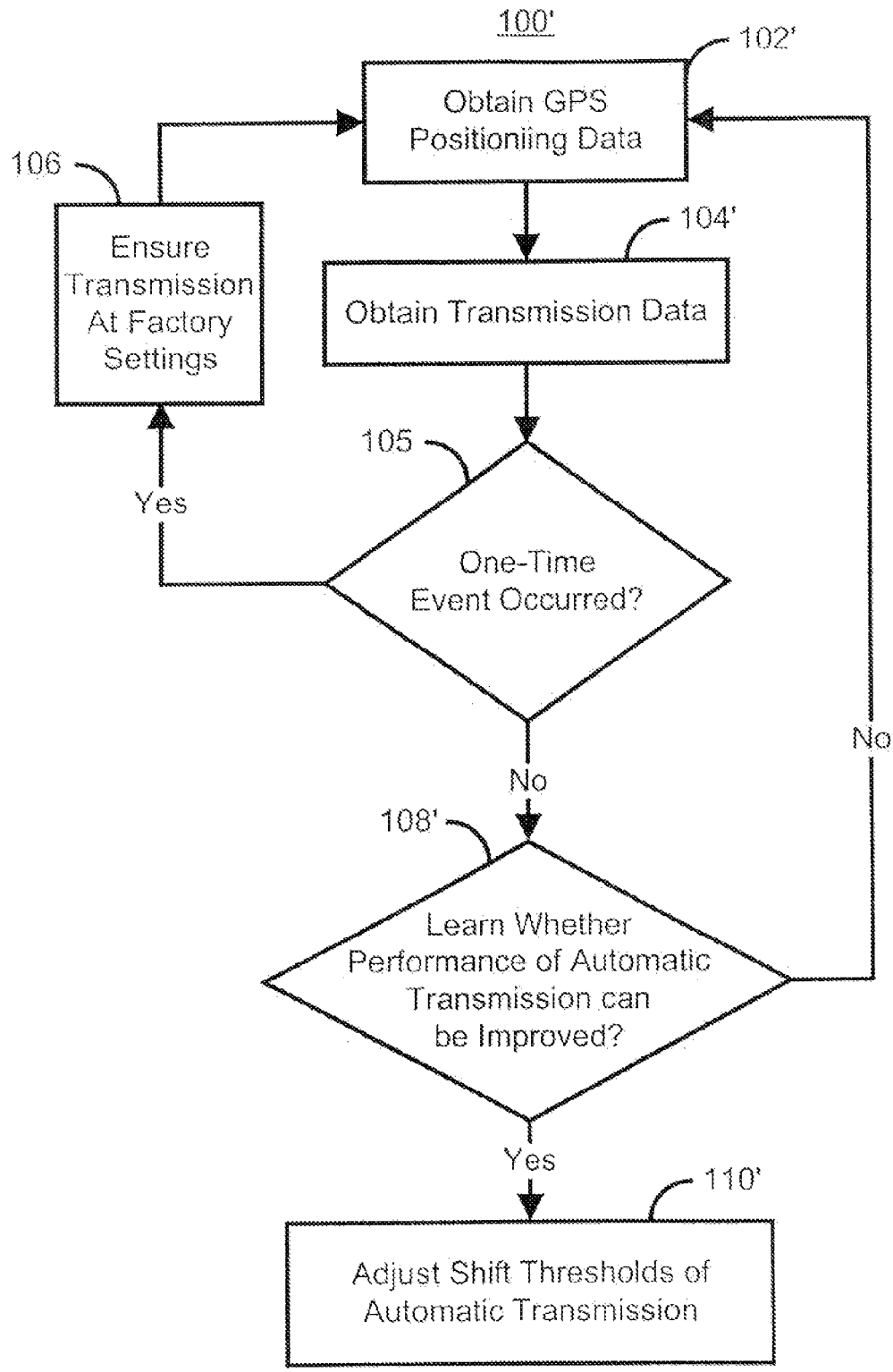
FIG. 3B is a high-level flow chart of a preferred embodiment of a method in accordance with the present invention for controlling an automatic transmission using GPS assistance.

FIG. 3B is a high-level flow chart of a preferred embodiment of a method 100' in accordance with present invention for controlling automatic transmission using GPS assistance. The method 100 is used in conjunction with an automatic transmission (not shown in FIG. 3B) and a GPS subsystem (not shown in FIG. 3B) that receives data from GPS satellite (not shown FIG. 3B). Many of the steps of the method 100' are substantially the same as for the method 100 depicted in FIG. 3A. Consequently, these steps are labeled similarly.

GPS positioning data is obtained, via step 102' in the method 100'. In a preferred embodiment, the positioning data obtained in step 102' includes the position of the vehicle as well as the direction of travel. The automatic transmission is also monitored to obtain transmission data, via step 104'. Preferably, the automatic transmission's load, or torque, is monitored in step 104'. In addition, the time in a particular gear may be monitored in step 104'. Preferably, step 102' and 104' occur throughout the operation of the automatic transmission Steps 102' and 104' correspond to the steps 102 and 104 of the method 100.

It is determined whether a one-time event has occurred, via step 105. The one-time event is preferably an event that is not discernible using GPS data alone. For example, the one-time event could include strong head or tail winds, an extra heavy load in a truck, an unusually light load in a truck, or towing a trailer behind the vehicle. Various means could be used to automatically determine when the head wind, load weight, trailer attachment or other one-time event has occurred. In a preferred embodiment, the gas mileage of the vehicle can be used, as discussed below.

If the one-time event has occurred, then the transmission will automatically be ensured to be at the factory settings, via step 106. Thus, step 106 may reset the shift thresholds of the automatic transmission to the factory levels. However, because this reset is characterized as a one-time event, the event should not be used in adjusting the shift thresholds for the automatic transmission, which is discussed below.

If the one-time event has not occurred, then using the positioning data and the transmission data it is learned whether performance of the automatic transmission can he improved, via step 108'. If it is determined that the performance of the automatic transmission can be improved in step

108', then the shift thresholds of the automatic transmission are adjusted for the positioning data to improve performance, via step 110'. Steps 108' and 110' are analogous to the steps 108 and 110 of the method 100.

Thus, the method 100' learns whether performance of the automatic transmission is suffering at certain positions and adjusts the shift thresholds of the automatic transmission to improve performance at these positions. As a result, shifting may be smoother, wear and tear on the automatic transmission reduced, and gas mileage improved. In addition, the method 100' allows certain events to be separately accounted for.

Figure 4:
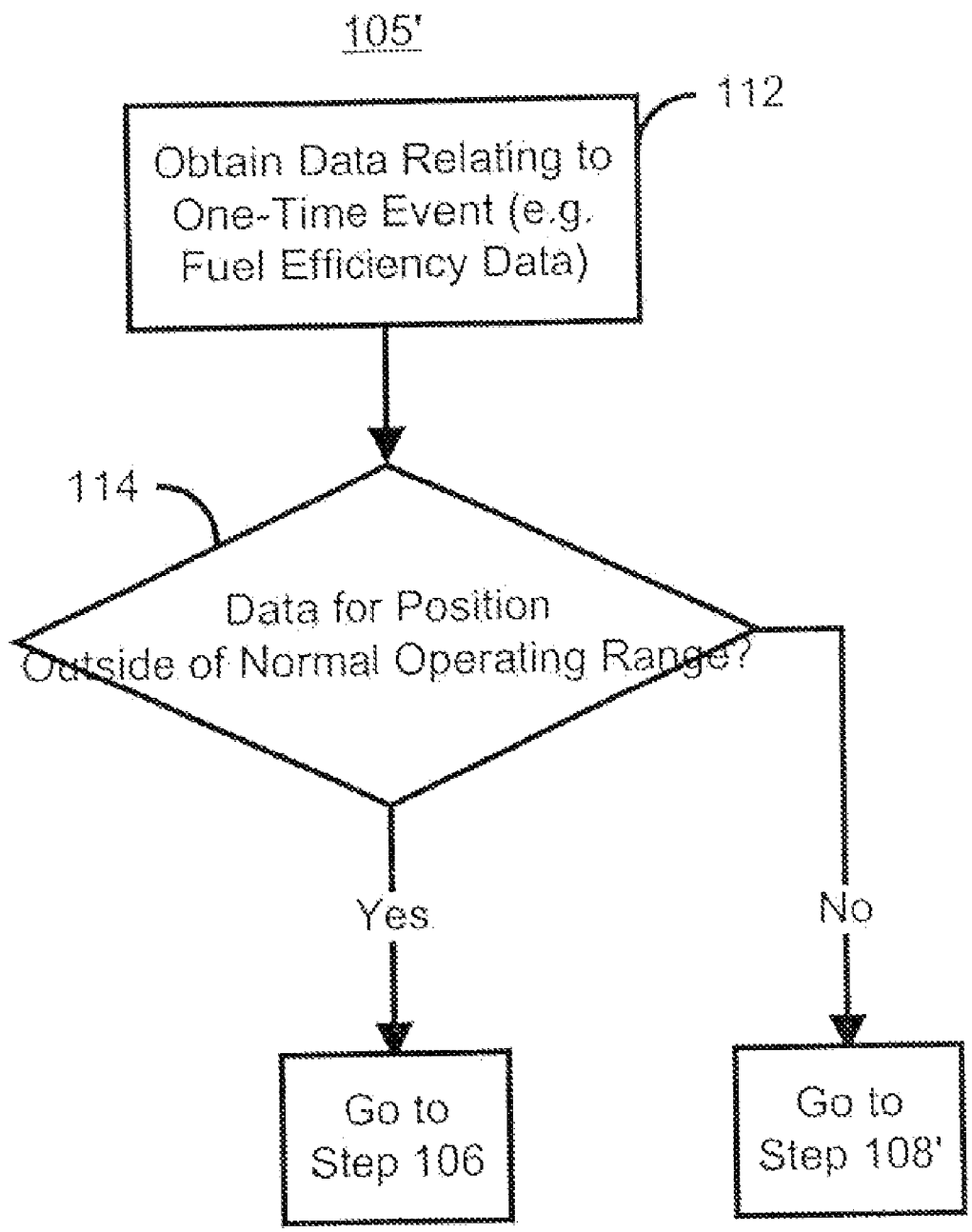
FIG. 4 is a flowchart of one embodiment of a method in accordance with the present invention for determining whether there is a one-time event.

FIG. 4 is a more detailed flow chart of one embodiment of a method 105' for determining whether the one-time event has occurred. Data relating to the one-time event is obtained, via step 112. In a preferred embodiment, step 112 determines the current fuel efficiency, such as the miles per gallon, of the vehicle. The fuel efficiency is used because it can be rapidly computed and is generally a direct indicator of an unusual load on the vehicle. The current fuel efficiency at the position (which can be determined using GPS positioning data) is then compared to a range of fuel efficiencies that are considered normal for the vehicle. Thus, it is determined whether the data for the current position, such as the current fuel efficiency, is outside of a normal operating range, via step 114. If so, them the vehicle is subject to a one-time event, such as an unusual load due to strong winds or the towing of another vehicle. If the current fuel efficiency is outside of the normal operating range, therefore, step 106 of the method 100' is performed. Thus, the transmission of the vehicle ensured to be at factory settings. Otherwise, step 108 of the method 100' is performed. As a result, it is learned whether performance of the automatic transmission car be improved.

Figure 5:
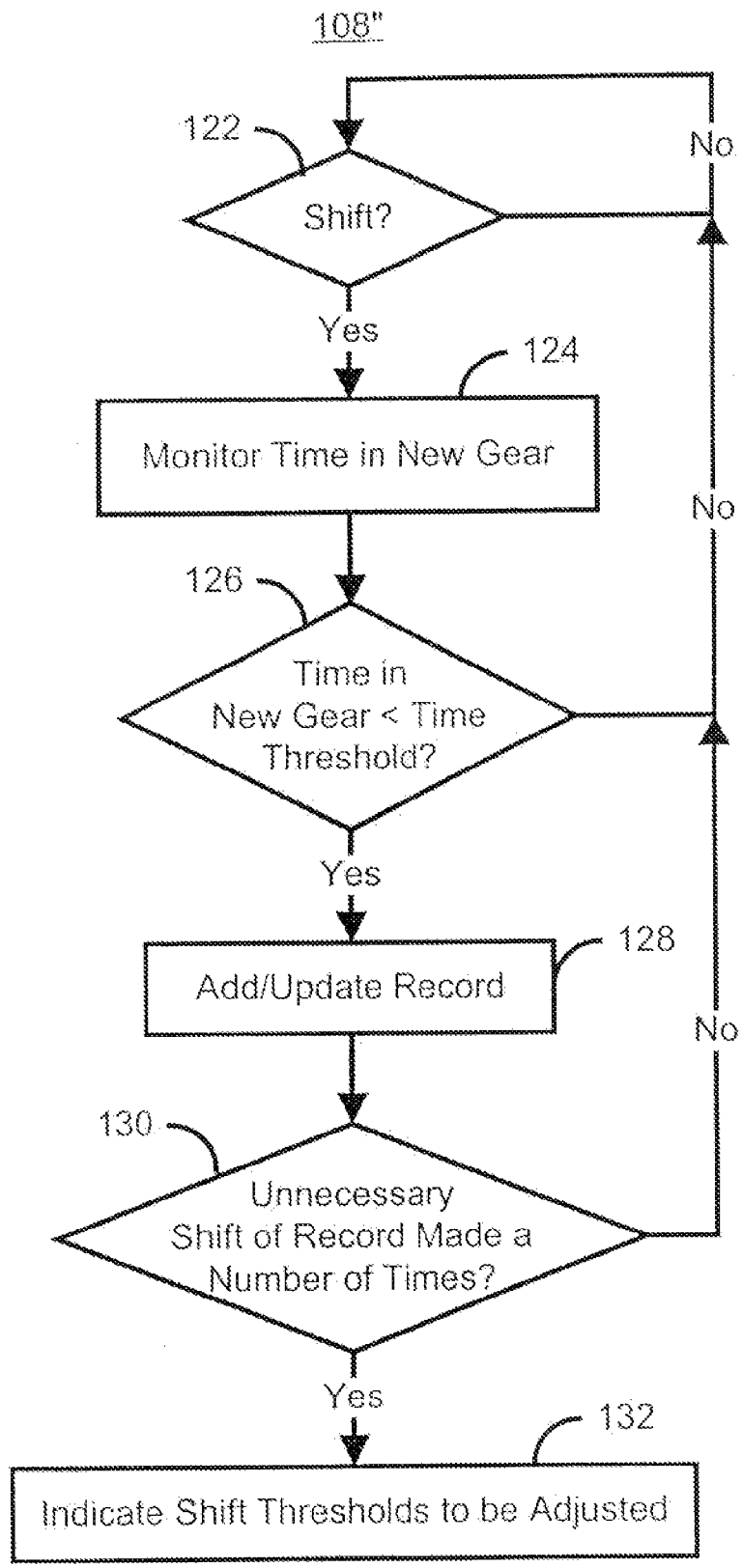
FIG. 5 is a more detailed flow chart of one embodiment of a method in accordance with the present invention for learning whether performance of the automatic transmission can be improved.

FIG. 5 is a more detailed flow chart of one embodiment of a method 108" in accordance with the present invention for learning whether performance of the automatic transmission can be improved. The method 108" can be used to perform the step 108 of the method 100 depicted in FIG. 3A or the step 108' of the method 100'. Referring to FIG. 5, it is determined whether the automatic transmission has performed a shift, via step 122. If so, the time in the new gear is monitored, via step 124. It is determined whether the automatic transmission shifts from the new gear back to the previous gear in less than a particular threshold time, via step 126. For example, the threshold time may be five to ten seconds or less. If the automatic transmission shifts back to the previous gear in less than the threshold time, then the automatic transmission is considered to have made an unnecessary shift. As discussed above, in an alternate embodiment, large, rapid changes in the load may be used to determine whether an unnecessary shift has occurred. Thus, step 126 could be considered to determine whether an unnecessary shift has occurred.

If it is determined in step 126 that the automatic transmission has shifted back to the previous gear then a record is created or updated, via step 128. The record indicates that an unnecessary shift has occurred as well as the positioning data that corresponds to the unnecessary shift. Note that a single record may be kept for multiple positions that are all only a short distance apart. Typically, the range of positions that correspond to a single record is relatively arbitrary. Thus, the vehicle need not be in exactly the same position when a shift and the corresponding unnecessary shift occur to be considered part of the same record and possibly result in adjustment of the shift threshold.

It is determined whether the unnecessary shift corresponding to the record has been made a particular number of times, via step 130. Preferably, step 130 determines whether for a certain percentage of times the position(s) correspond to the record has been encountered that an unnecessary shift has occurred. In one embodiment, the percentage is twenty percent. If so, then it is indicated that the shift thresholds should be adjusted in step 132. Otherwise the method 108" returns to step 122. Thus, the method 108" determines whether an unnecessary shift has occurred for some percentage of the times a particular area has been encountered. If so, then the performance of the automatic transmission can be improved. Thus, the shift thresholds are adjusted, as described below.

Figure 6A:
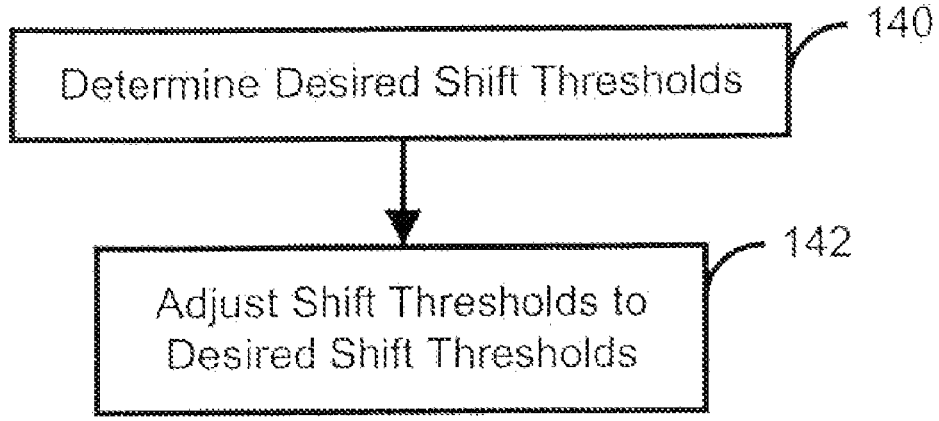
FIG. 6A is a flow chart of one embodiment of at method in accordance with the present invention for adjusting a shift threshold.
Figure 6B:
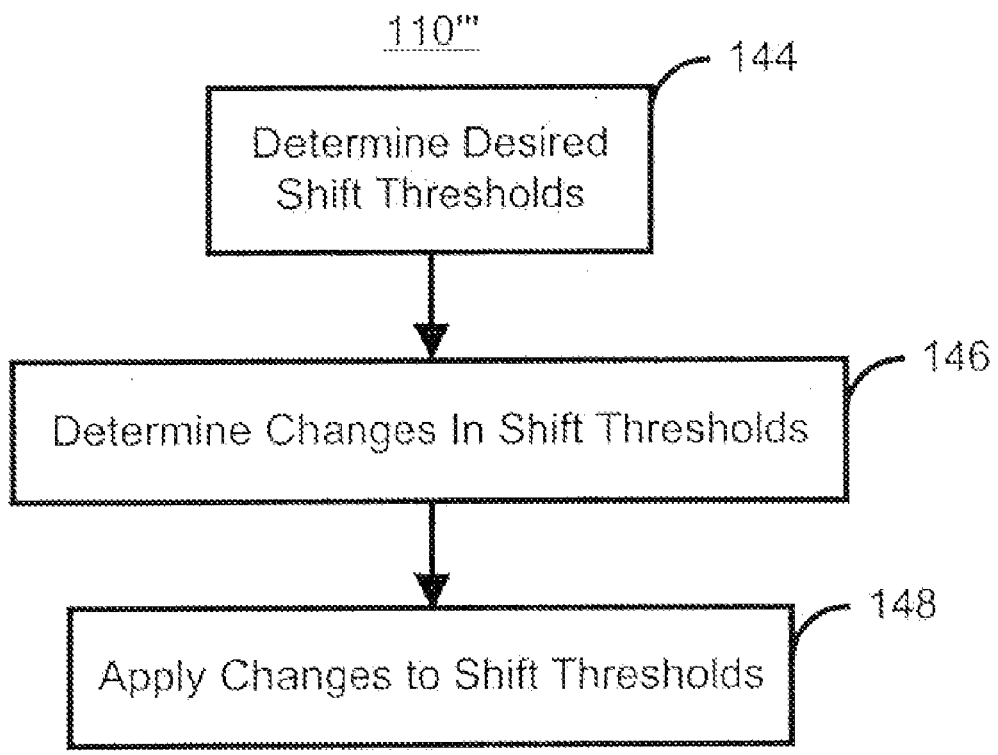
FIG. 6B is a flow chart of a second embodiment of a method in accordance with the present invention for adjusting a shift threshold.

FIGS. 6A and 6B depict methods in accordance for adjusting the shift thresholds. FIG. 6A is a flow chart of one embodiment of a method 110" in accordance with the present invention for adjusting a shift threshold. Thus, the method 110" can be used for the step 110 and 110' of the methods 100 and 100', respectively, of FIGS. 3A and 3B, respectively. Desired new thresholds for the automatic transmission are determined, via step 140. If the unnecessary shift was a shift to a higher gear, the new thresholds are higher. If the unnecessary shift was to a lower gear, the new thresholds are lower than current thresholds. In addition, in one embodiment, the vehicle may detect other driving conditions and change the desired shift thresholds accordingly. For example, the vehicle may detect the outside temperature, whether rain is falling or determine the road conditions and change the desired thresholds accordingly. The shift thresholds are then adjusted to the desired levels for the positioning data, via step 142. Step 142 preferably sets the shift thresholds for a region around the positioning data corresponding to the record discussed in the method 108" of FIG. 5. Referring back to FIG. 6A, when the vehicle thus approaches the region corresponding to the record, the shift thresholds will be adjusted to the desired level. As a result, performance of the automatic transmission should be improved. Consequently, the lifetime of the automatic transmission, the smoothness of the ride for passengers in the vehicle and gas mileage for the vehicle should be improved. Note that if the desired thresholds are not sufficient to prevent an unnecessary shift, then the methods 100, 100', 108" and 110' may be repeated.

FIG. 6B is a flow chart of a second embodiment of a method 110''' in accordance with the present invention for adjusting a shift threshold. Thus, the method 110''' can be used for the step 110 and 110' of the methods 100 and 100', respectively, of FIGS. 3A and 3B, respectively. Desired new thresholds for the automatic transmission are determined, via step 144. If the unnecessary shift was a shift to a higher gear, the new thresholds are higher. If the unnecessary shift was to a lower gear, the new thresholds are lower than current thresholds. In addition, in one embodiment, the vehicle may detect other driving conditions and change the desired shift thresholds accordingly. For example, the vehicle may detect the outside temperature, whether rain is falling or determine the road conditions and change the desired thresholds accordingly. Changes in the shift thresholds are then determined, via step 146. These changes are a fraction of the difference between the current shift thresholds and the desired shift thresholds. In some embodiments, the changes may be one-tenth to one-half of the difference between the current shift thresholds and the desired shift, thresholds. The changes in the shift thresholds are then applied to the shift thresholds for the positioning data, via step 148. Step 148 preferably sets the shift thresholds for a region around the positioning data corresponding to the record discussed in the method 108" of FIG. 5. Referring back to FIG. 5B, when the vehicle thus approaches the region corresponding to the record, the shift thresholds will be adjusted to the desired level. Thus, the shift thresholds are adjusted to be closer to the desired level in step 148. As the vehicle repeatedly encounters the same geographic region, the shift thresholds will be slowly adjusted toward a desired level. Furthermore, if the conditions change in the area, the shift thresholds will be slowly adjusted to a new desired level. As a result, performance of the automatic transmission should be improved. Consequently, the lifetime of the automatic transmission, the smoothness of the ride for passengers in the vehicle and gas mileage for the vehicle should be improved. Note that if the desired thresholds are not sufficient to prevent an unnecessary shift, then the methods 100, 100', 108 " and 110" may be respeated.

Note that the methods 110" and 110'" can also adjust the shift thresholds to be closer to the factory settings. For example, suppose that the method 110' or 110" was used to adjust the shift thresholds of the vehicle away from the settings to account for certain road conditions. Suppose also that these road conditions change sufficiently to start to result in unnecessary shifts when the new shift thresholds determined in the methods 110' and 110" are used. In such a case, the methods 100 and 108 will indicate that performance can be improved by changing the shift thresholds. The methods 110' and 110" may then recalculate new shift thresholds (which are closer to the factory set shift thresholds) or utilize the factory set shift thresholds for the automatic transmission. The methods 110' and 110" then adjust the shift thresholds to be closer to the factory set shift thresholds. However, in a preferred embodiment, the methods 110' and 110" will use an even smaller adjustment. For example, the methods 110' and 110" may change the shift thresholds by approximately one-fiftieth of the difference between the factory set shift threshold and the current shift thresholds. The adjustment toward the factory set shift thresholds is, therefore, preferably made in smaller increments. The methods 100, 100', 108", 110' and 110" can continue to learn from and account for changes in driving conditions to improve performance of the automatic transmission.

Figure 7:
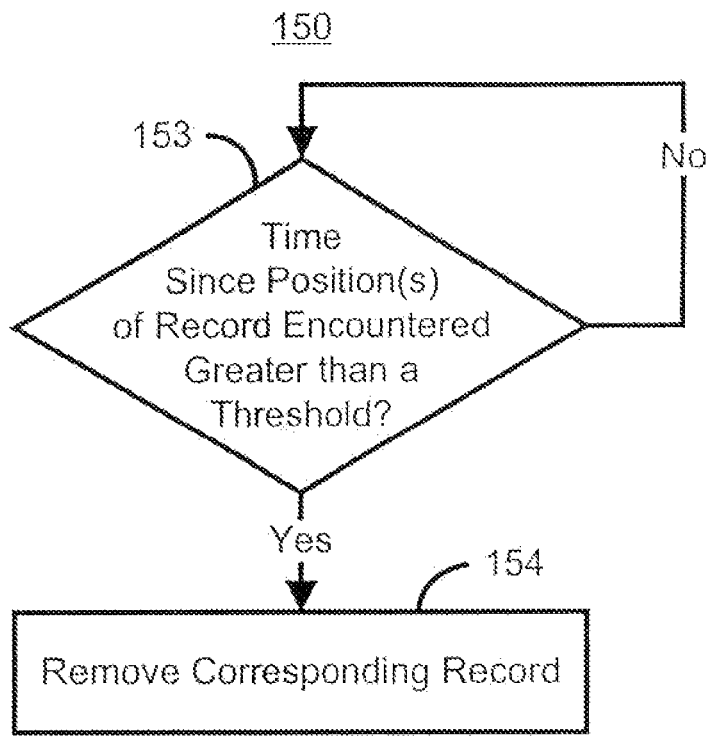
FIG. 7 is a flow chart of one embodiment of a method in accordance with the present invention for removing records in the automatic transmission using GPS assistance.

FIG. 7 is a flow chart of one embodiment of a method 150 in accordance with the present invention for removing records in automatic transmission using GPS assistance. The method 150 is used to remove records provided or adjusted using the method 108" of FIG. 5. Records may be desired to be removed because the vehicle may not drive through a particular area for a long period of time, for example because the owner of the vehicle moves. Thus, using the memory to store these unused records could be wasteful. It is, therefore, determined whether the vehicle has not encountered the region corresponding to the record for a particular period of time, via step 152. The period of time is preferably relatively long, such as one or a few months. If the vehicle has been in this area, then nothing is done. However, if it is determined that the vehicle has not been in the region for the period of time, then the record is removed from memory, via step 154. Thus, more efficient use of resources can be made. Further, if the vehicle does encounter this area again and an unnecessary shift occurs, then the record can be added again using the method 108" described in FIG. 5.

Figure 8:
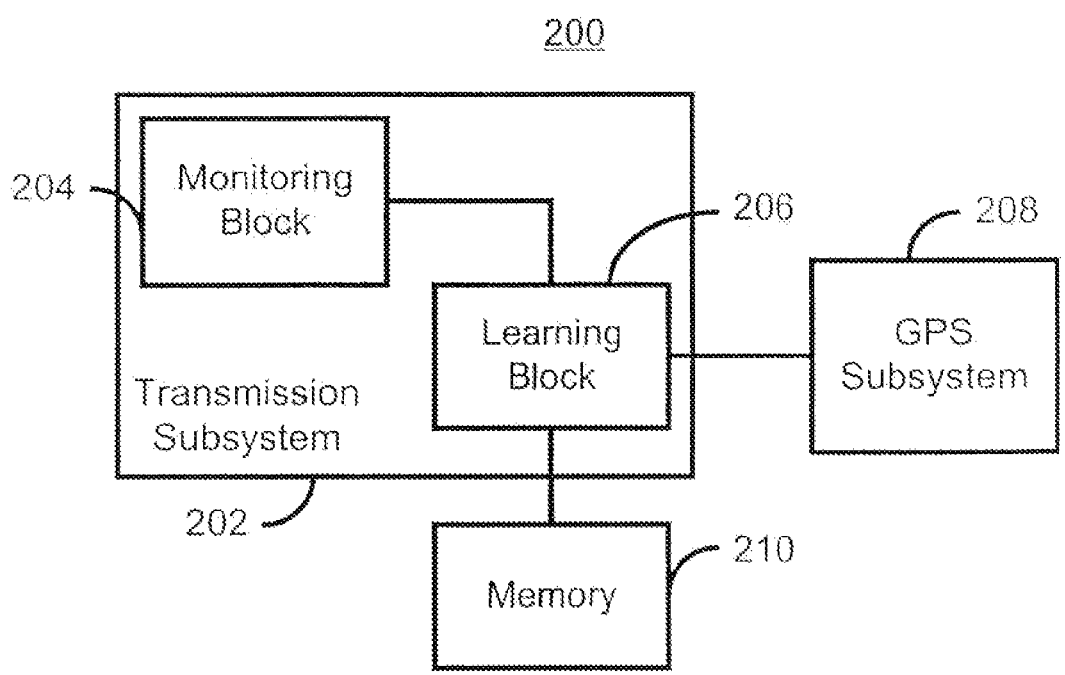
FIG. 8 is a block diagram of one embodiment of a system in accordance with the present invention for controlling the automatic transmission using GPS assistance.

FIG. 8 is a block diagram of one embodiment of a system 200 in accordance with the present invention for controlling the automatic transmission using GPS assistance. The system 200 can implement the methods 100, 100', 108", 110' and 110" The system 200 includes transmission subsystem 202 and a GSP subsystem 208. The GPS subsystem 208 receives information from a GPS satellite (not shown in FIG. 8) and provides the positioning data used in the methods 100, 100', 108", 110' and 110". In one embodiment, the GPS subsystem 208 receives data directly from the GPS satellite and processes the data accordingly. In such an embodiment, the GPS subsystem 208 would include a transmitter (not explicitly shown) and receiver (not explicitly shown) for communicating with the satellite. However, in another embodiment, the GPS subsystem 208 utilizes positioning data obtained by another GPS system of the vehicle, such as a GPS navigation system. In such a case, the GPS subsystem 208 need not include any mechanism for direct communication with the GPS satellite.

The transmission subsystem 202 includes a monitoring block 204 and a learning block 206. The monitoring block 204 receives data from the automatic transmission and provides the transmission data to the learning block. The learning block 206 utilizes the transmission data and the positioning data obtained from the GPS subsystem 208 to determine whether performance of the automatic transmission can be improved. Although monitoring block 204 and the learning block 206 are depicted as separate, they could be implemented together as a single unit. Thus, in a preferred embodiment, the monitoring block and learning block implement the steps 104 and 108 of the method 100, while the GPS subsystem 208 implements the step 102 of the method 100. The system 200 also preferably includes a memory 210 for storing the records described in the method 108".

Figure 9A:
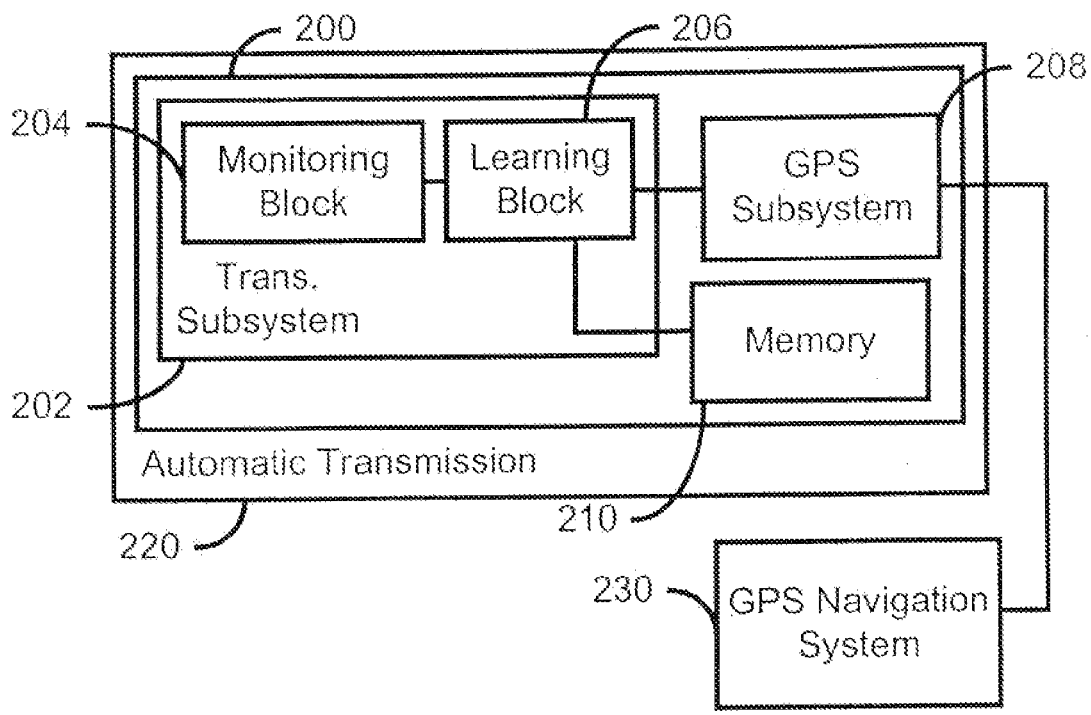
FIG. 9A is a block diagram of one embodiment of the system in accordance with the present invention as used in a vehicle.
Figure 9B:
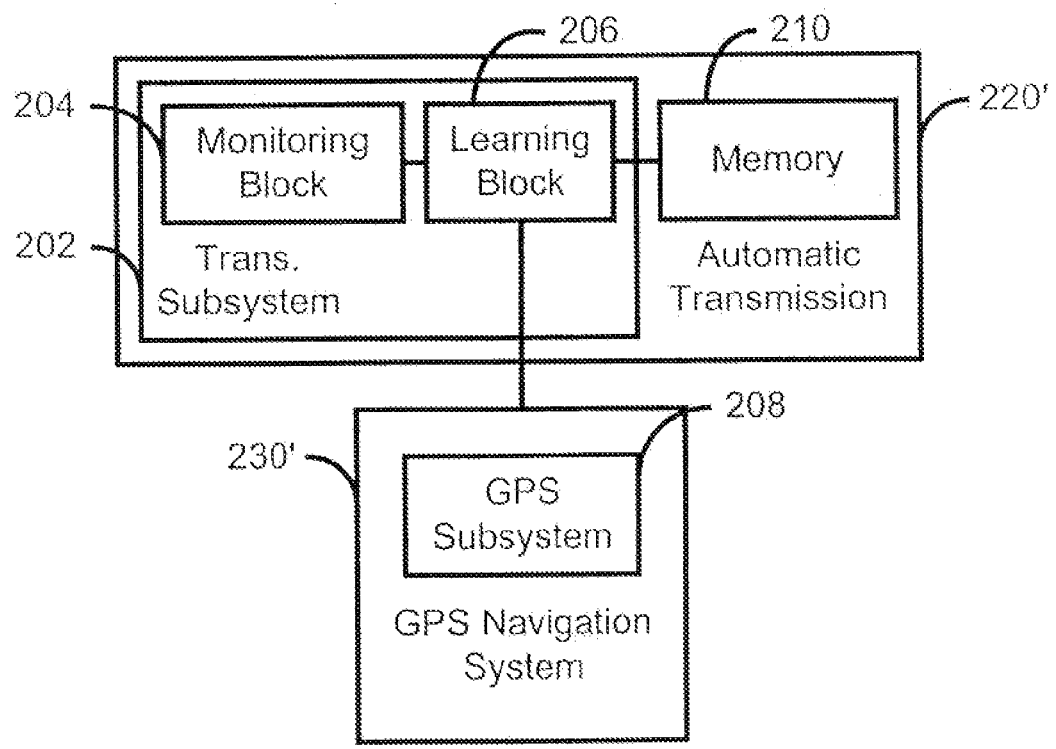
FIG. 9B is a block diagram of a second embodiment of the system in accordance with the present invention as used in a vehicle.

The system 200 can be integrated into the vehicle in a variety of ways. FIGS. 9A and 9B depict two ways in which the system 200 can be implemented in the vehicle. FIG. 9A is a block diagram of one embodiment of the system 200 in accordance with the present invention as used in a vehicle. As shown in FIG. 8A, the system 200 is integrated into an automatic transmission 220. In one embodiment, the system 200 could be integrated into the control logic (not explicitly shown) of the automatic transmission 220. Furthermore, the GPS subsystem 208 is depicted as linked with a GPS navigational system 230. In such an embodiment, the GPS navigational system 230 would communicate with a GPS satellite (not shown) for obtaining positioning data. The GPS subsystem 208 would then obtain the data from the GPS navigational system 230 and perform any additional processing required. However, in an alternate embodiment, the GPS system 208 would communicate directly with the GPS satellite. In such a case, the GPS subsystem 208 need not be linked with the GPS navigational system 230.

FIG. 9B is a block diagram of a second embodiment of the system 200 in accordance with the present invention as used in a vehicle. A portion of the system 200 is still implemented in the automatic transmission 220' or the control logic (not explicitly shown) of the automatic transmission 220'. In such an embodiment, the transmission subsystem 202 is implemented in the automatic transmission 220', while the GPS subsystem 208 is implemented in the GPS navigation system 230'. Thus, the portions of the system 200 that monitor the automatic transmission, learn whether the automatic transmission's operation can be improved and adjust shift levels are incorporated into the automatic transmission. The portions of the system 200 that obtain the positioning data from the GPS satellite are incorporated into the GPS navigations system 230'. However, the transmission subsystem 202 and the GPS subsystem 208 still function together to improve performance of the automatic transmission 220' using GPS positioning data.

A method and system has been disclosed for controlling an automatic transmission using the assistance of GPS. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for controlling an automatic transmission comprising:
   a global positioning satellite (GPS) subsystem for obtaining positioning data using a GPS satellite; and
   a transmission subsystem coupled to the transmission and the GPS subsystem for monitoring the automatic transmission to obtain transmission data, for automatically learning whether performance of the automatic transmission can be improved utilizing the positioning data and the transmission data and for automatically adjusting a shift threshold for the automatic transmission for the positioning data if the transmission subsystem determines that the performance of the automatic transmission can be improved;
   wherein the automatic transmission subsystem determines automatically that the performance of the automatic transmission can be improved when a predetermined load on the automatic transmission system increases by a particular amount within a particular time,
   wherein the automatic transmission subsystem automatically adjusts a shift threshold if the learning determines that the performance of the automatic transmission can be improved and if the positioning data can be obtained using the GPS, and the automatic transmission automatically substation sets the shift threshold to a preset shift threshold if the positioning data cannot be obtained using the GPS.

2. The system of claim 1 wherein the transmission subsystem adjusts the threshold by determining whether a driving condition exists and determining a desired threshold for the automatic transmission based on the driving condition.

3. The system of claim 1 wherein the transmission subsystem further adjusts the shift threshold only if the transmission subsystem determines a particular number of times that the performance of the automatic transmission can be improved.

4. The system of claim 1 wherein the transmission subsystem further adjusts the shill threshold each time the transmission subsystem determines that performance of the automatic transmission can be improved.

5. The system of claim 1 further comprising:
   a memory coupled to the transmission subsystem for storing a record of the positioning data and transmission data.

6. The system of claim 5 wherein the transmission subsystem further removes the record if the positioning data is not repeated for a particular time.

7. The system of claim 1 wherein the transmission subsystem monitors a load on the transmission.

8. The system of claim 7 wherein the transmission subsystem determines whether the load indicates that the automatic transmission is to shift up or shift down and wherein the transmission subsystem further adjusts the shift level up if the load indicates that the automatic transmission is to shift up and adjusting the shift Threshold down if the load indicates that the automatic transmission is to shift down.

9. The system of claim 1 wherein the GPS subsystem and the transmission subsystem are integrated into the automatic transmission.

10. The system of claim 1 wherein the GPS subsystem is integrated into a GPS navigation system.

* * * * *